United States Patent
Gallagher et al.

(10) Patent No.: US 7,163,578 B2
(45) Date of Patent: Jan. 16, 2007

(54) SEALING COMPOSITION HAVING CORROSION INHIBITOR THEREIN

(75) Inventors: Laurie A. Gallagher, Bethel, CT (US); Filipe J. Marinho, Danbury, CT (US); Carol S. Jeffcoate, Danbury, CT (US); Aleksei Gershun, Southbury, CT (US)

(73) Assignee: Prestone Products Corporation, Danbury, CT (US)

( * ) Notice: Subject to any disclaimer, the term of this patent is extended or adjusted under 35 U.S.C. 154(b) by 0 days.

(21) Appl. No.: 11/033,035

(22) Filed: Jan. 11, 2005

(65) Prior Publication Data

US 2005/0150425 A1    Jul. 14, 2005

Related U.S. Application Data

(63) Continuation of application No. 10/315,330, filed on Dec. 10, 2002, now Pat. No. 6,840,990.

(51) Int. Cl.
*C09K 3/12*    (2006.01)

(52) U.S. Cl. .................. 106/33; 106/14.11; 106/14.15; 106/14.21; 106/14.41; 106/14.42; 106/14.44; 252/70; 252/72

(58) Field of Classification Search ............. 106/14.11, 106/14.15, 14.21, 14.41, 14.42, 14.44, 33; 252/70, 72

See application file for complete search history.

(56) References Cited

U.S. PATENT DOCUMENTS

| 4,439,561 | A | * | 3/1984 | Barber | 524/13 |
| 4,524,158 | A | * | 6/1985 | Barber | 523/130 |
| 4,524,159 | A | * | 6/1985 | Barber | 523/177 |
| 6,840,990 | B1 | * | 1/2005 | Gallagher et al. | 106/33 |

* cited by examiner

*Primary Examiner*—Anthony J. Green

(57) ABSTRACT

A composition for sealing at least one fluid leak in heat exchange systems comprises at least one solvent, and fibrillated fiber in an amount and of a size sufficient to become entrained in and seal the one leak. At least one corrosion inhibitor is present in an amount sufficient to aid in prevention of corrosion of at least two metals. The corrosion inhibitor is compatible with coolants having organic acid corrosion inhibiting agents therein, and with coolants having silicate corrosion inhibiting agents therein.

10 Claims, 1 Drawing Sheet

SEALING COMPOSITION HAVING
CORROSION INHIBITOR THEREIN

CROSS REFERENCE TO RELATED APPLICATIONS

This application is a continuation of commonly owned and assigned U.S. patent application Ser. No. 10/315,330 filed Dec. 10, 2002, now U.S. Pat. No. 6,840,990, issued on Jan. 11, 2005.

BACKGROUND

The present invention relates generally to sealing compositions, and more specifically to sealing compositions for use with heat exchange systems.

Vehicle manufactures typically advise owners of their vehicles to change the antifreeze in the cooling systems of their vehicles every two years, in order to prevent the accumulation of corrosion materials, such as rust and solder corrosion residue. The corrosion materials are often formed as some corrosion inhibitors in antifreeze break down from heat over time. These corrosion materials reduce cooling system efficiency by interfering with the flow of coolant through the air/liquid heat exchanging fin-tubes of the radiator core. An effective cooling system is not only important for engine performance and life, but in many automobiles the transmission fluid may also be cooled by circulation through the radiator. Further, the abrasive nature of the suspended corrosive materials may increase the wear on the water pump, hoses, thermostat, and heater core—and malfunction of cooling system components is said to be a significant cause of highway breakdowns.

As vehicles age, small leaks often form in the radiator. One means of preventing loss of cooling fluid through these small leaks without replacing the radiator is to add a so-called "stop leak" composition to the radiator. These "stop leak" sealing compositions for automotive heat exchange/cooling systems have been known for several years. However, these sealing compositions generally did not include corrosion inhibitors. As such, if vehicle owners were not careful about flushing the cooling system and replacing used antifreeze with new antifreeze having new corrosion inhibitors therein, the radiator may continue to corrode and form new leak paths. Further, if the vehicle owner added conventional coolant to extended life coolant (or vice versa) in the vehicle, the corrosion inhibitors in these coolants are generally not compatible. As a result, the corrosion inhibitors in both types of coolants may not work properly, perhaps leaving the radiator substantially without effective corrosion resistance.

SUMMARY

The present invention addresses and substantially solves the above-mentioned problems by providing a composition for sealing at least one fluid leak in heat exchange systems comprising at least one solvent, and fibrillated fiber in an amount and of a size sufficient to become entrained in and seal the one leak. At least one corrosion inhibitor is present in an amount sufficient to aid in prevention of corrosion of at least two metals. The corrosion inhibitor is compatible with coolants having organic acid corrosion inhibiting agents therein, and with coolants having silicate corrosion inhibiting agents therein.

BRIEF DESCRIPTION OF THE DRAWINGS

Objects, features and advantages of the present invention will become apparent by reference to the following detailed description and drawings, in which.

DETAILED DESCRIPTION OF THE PREFERRED EMBODIMENTS

Figure 1:
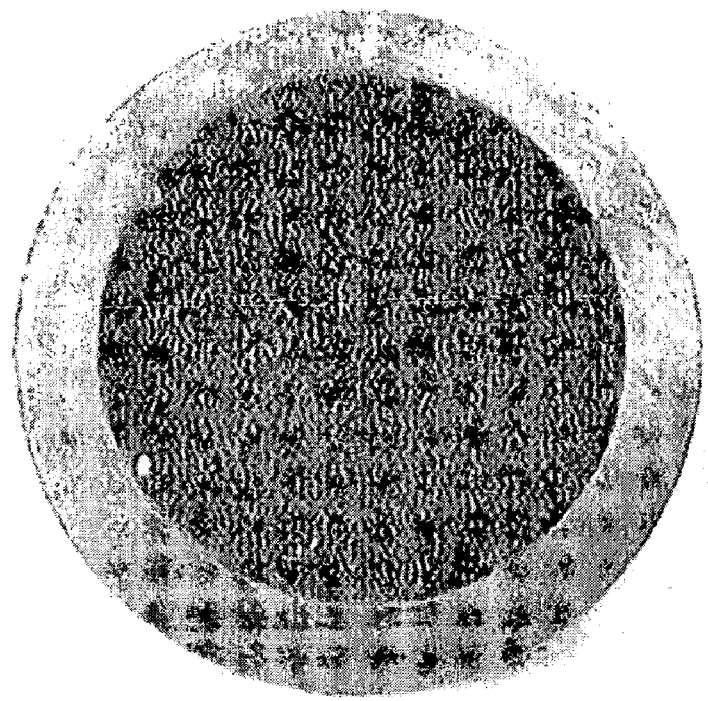
FIG. 1 is a photograph of a metal substrate tested with a used conventional coolant without an embodiment of the composition of the present invention therein, showing corrosion resulting from a corrosion rate of about 5 mg/cm$^2$/wk.

The present invention is predicated upon the unexpected and fortuitous discovery that a sealing composition (as in an embodiment of the present invention) for heat exchange/ cooling systems may include corrosion inhibitors which may give added protection and extended life to vehicles, while also being compatible with both conventional and extended life coolants. Further, the composition of the present invention has been found to provide desirous corrosion benefits to more than one type of metal. The types of corrosion the composition of the present invention aids in preventing include, but are not limited to general corrosion, localized corrosion, pitting of aluminum and other metals, rust, and the like.

The sealing composition of the present invention may be useful for many applications using heat exchange systems, and is adapted to seal one or more fluid leaks in such heat exchange systems. However, the composition may find particular use with automotive heat exchange/cooling systems.

An embodiment of the sealing composition of the present invention comprises at least one solvent. It is to be understood that the solvent may comprise any suitable solvent, however, in an embodiment, the solvent comprises water. It is to be understood that the water may be tap water, deionized water, distilled water, softened water, and the like, as well as mixtures thereof.

An embodiment of the sealing composition further comprises fibrillated fiber in an amount and of a size sufficient to become entrained in and seal the at least one leak. It is to be understood that any suitable fibrillated fiber may be used. However, in an embodiment, the fibrillated fiber comprises poly-paraphenylene terephthalamide pulp. One such poly-paraphenylene terephthalamide pulp is commercially available from DuPont Advanced Fibers Systems in Richmond, Va. under the tradename KEVLAR Aramid Pulp.

At least one corrosion inhibitor is present in an amount sufficient to aid in prevention of corrosion of at least two metals. That is, the composition of the present invention has been shown to be efficacious in prevention of corrosion of two or more metals.

The corrosion inhibitor(s) is adapted to be compatible with coolants having organic acid corrosion inhibiting agents therein (also known as "extended life" coolants/ antifreeze), and with coolants having silicate corrosion inhibiting agents therein (also known as "conventional" coolants/antifreeze).

It is to be understood that the corrosion inhibitor may be selected from any suitable corrosion inhibitor or mixture of corrosion inhibitors which aid in prevention of corrosion of at least two metals, and is compatible with both conventional and extended life coolants. The corrosion inhibitor(s) of choice may be alkali metal nitrates, azoles, and/or modified azoles, and/or mixtures thereof.

In an embodiment, the corrosion inhibitor is a mixture of sodium nitrate and modified azoles. It is to be understood that the modified azoles may include any suitable modified azole and/or mixture of modified azoles. One non-limitative example of a modified azole is tolytriazole (TTZ). In an embodiment, the modified azole(s) is commercially available from PMC Specialties Group under the tradename COBRATEC 926 Liquid.

A main component of both the conventional and extended life coolants is glycols. Non-limitative examples of glycols include ethylene glycol, diethylene glycol, propylene glycol, and/or glycerol, and/or mixtures thereof. The conventional and extended life coolants differ in the type(s) of corrosion inhibitors added to each. Conventional coolants add silicate (s) as a primary corrosion inhibitor. Extended life coolants add organic acid(s) as a primary corrosion inhibitor. Non-limitative examples of such organic acids include 2-ethylhexanoic acid, benzoic acids, sebacic acids, nonanoic acids, dodecanoic acids, neodecanoic acids, and mixtures thereof.

Examples of some of the metals which may receive added corrosion resistance from the composition of the present invention include, but are not to be limited to steel, iron, iron alloys, aluminum, aluminum alloys, brass, brass alloys, copper, copper alloys, lead, lead alloys, and mixtures thereof.

The composition of the present invention may further optionally comprise particulate material in an amount and of a size sufficient to coact with the fibrillated fiber to seal the leak(s). It is to be understood that any suitable particulate material may be used; however, in an embodiment, the particulate material is a seed meal. One such suitable non-limitative example of a seed meal is soybean meal.

U.S. Pat. Nos. 4,439,561 and 4,524,159, issued to Barber for a "Sealant Composition and Method" and a "Leak Stopping Composition and Method," respectively, are each incorporated herein by reference in their entirety. Among other things, the '561 and '159 patents describe in some detail the fibrillated fibers and particulate material.

The composition of the present invention may further optionally comprise at least one buffering compound and/or mixture of buffering compounds present in an amount sufficient to maintain the pH of the composition within a range of between about 5 and about 13. In an embodiment of the composition of the present invention, the buffering compound(s) is present in an amount sufficient to maintain the pH of the composition within a range of between about 8 and about 11. In a further embodiment, the buffering compound(s) is present in an amount sufficient to maintain the pH of the composition at about 9.5.

It is to be understood that any suitable buffering compound and/or mixture of buffering compounds may be used. However, in an embodiment, the buffering compound(s) is at least one of soda ash, borax, phthalates, tartrates, phosphates, amines and mixtures thereof. In an alternate embodiment, the buffering compound(s) is soda ash and/or borax, and/or mixtures thereof.

In a further embodiment, the buffering compound(s) may be selected from potassium hydrogen phthalate, potassium hydrogen tartrate, potassium dihydrogen phosphate, disodium hydrogen phosphate, potassium tetroxalate, and tris (hydroxymethyl)aminomethane. These salts are usually used with hydroxide (either potassium or sodium) or a strong acid (usually hydrochloric) for buffering.

The composition of the present invention may further optionally comprise at least one mineral-based material present in an amount sufficient to aid in sealing the leak(s). It is to be understood that the mineral-based material may comprise any suitable material, however, in an embodiment, the mineral-based material is a clay or clay analog selected from bentonite, smectite, montmorillonite, paligorskite, attapulgite, sepiolite, saponite, kaolinite, halloysite, hectorite, beidellite, stevensite, fire clay, ground shale, mud, silt, and mixtures thereof.

In a further embodiment, the mineral-based material is a mixture of bentonite and attapulgite. Any of the mineral-based materials recited herein may be obtained from any suitable source. As an example, attapulgite clay is commercially available under the tradename ATTACLAY from Engelhard Corporation in Iselin, N.J. As a further example, bentonite clay is commercially available under the tradename KWK Bentonite from American Colloid Company in Arlington Heights, Ill.

The composition of the present invention may further optionally comprise one or more thickening agents. It is to be understood that any suitable thickening agents may be used, and in fact, one or more of the mineral-based materials recited hereinabove may suffice for thickening the composition as desired. In an embodiment, the thickening agent is an acrylic copolymer. One such acrylic copolymer is commercially available under the tradename ACRYSOL ASE-60 from Rohm and Haas Company in Philadelphia, Pa.

The composition of the present invention may further optionally comprise at least one biocide present in an amount sufficient to provide predetermined biocidal activity. A biocide may be desirable to render the composition more pleasing to the senses of the end user. It is to be understood that any suitable biocide may be used to provide the desired biocidal activity (if in fact such activity is desired). In an embodiment, the biocide has glutaraldehyde as its active ingredient. One such biocide having glutaraldehyde as its active ingredient is commercially available under the tradename UCARCIDE 225 from Dow Chemical Company in Midland, Mich. (formerly Union Carbide in Parsippany, N.J.).

The composition of the present invention further is adapted to aid in prevention of corrosion of a metal container in which the composition is stored. For example, the composition of the present invention may successfully be stored in aluminum containers substantially without deleterious effects from corrosion and the like. It is further believed that the composition of the present invention may successfully be stored in tin plated steel containers, as well as in containers formed from any suitable metal, including but not limited to the metals recited hereinabove, e.g. steel, iron, iron alloys, aluminum, aluminum alloys, brass, brass alloys, copper, copper alloys, lead, lead alloys, and mixtures thereof. The composition of the present invention may also be stored in a suitable polymeric container.

The composition of the present invention may also be introduced into the heat exchange system via an overflow tank. As a non-limitative example thereof, an embodiment of the composition of the present invention may be introduced into an automobile by adding directly to the radiator, or indirectly to the radiator through an overfill tank.

To further illustrate the present invention, the following examples are given. It is to be understood that these examples are provided for illustrative purposes and are not to be construed as limiting the scope of the present invention.

EXAMPLE 1

Embodiments of the composition of the present invention have the following general formula.

| Ingredients | Weight % range | Function (exemplary, ie. non-limitative) |
| --- | --- | --- |
| Water | 48–99 | Primary solvent |
| Soda Ash | 0–1 | To raise pH for dispersion of bentonite |
| KWK Bentonite | 0–15 | Suspending and thickening agent; provides some sealing benefits |
| Borax (pentahydrate) | 0–2 | Buffer |
| Ucarcide 225 | 0–5 | Biocide |
| Kevlar pulp (Dry) | 0.05–2 | Binds plugging material |
| Soybean Meal | 0–5 | Plugging material |
| Attaclay | 0–10 | Clay to aid in drying plugged leaks |
| Sodium Nitrate | 0–5 | Corrosion inhibitor, primarily for aluminum |
| Cobratech 926 | 0–5 | Mixture of azoles; multi-metal corrosion inhibitor. |
| ASE-60 | 0–2 | An acrylic emulsion to thicken formula and reduce settling |

EXAMPLE 2

A non-limitative embodiment of the present invention is designated as formula AS-148. If not otherwise specified, AS-148 is the formula for the inventive composition referred to in the Experimental section below.

| Ingredients | Weight % | Function (exemplary, ie. non-limitative) |
| --- | --- | --- |
| Tap Water | 88.285 | Primary solvent |
| Soda Ash | 0.005 | To raise pH for dispersion of bentonite |
| KWK Bentonite | 5.000 | Suspending and thickening agent; provides some sealing benefits |
| Borax (pentahydrate) | 0.560 | Buffer |
| Ucarcide 225 | 1.000 | Biocide |
| Kevlar pulp (Dry) | 0.150 | Binds plugging material |
| Soybean Meal | 1.500 | Plugging material |
| Attaclay | 1.000 | Clay to aid in drying plugged leaks |
| Sodium Nitrate | 1.000 | Corrosion inhibitor, primarily for aluminum |
| Cobratech 926 | 1.000 | Mixture of azoles; multi-metal corrosion inhibitor. |
| ASE-60 | 0.500 | An acrylic emulsion to thicken formula and reduce settling |

Experimental

Some previous sealing compositions were formulated when the average cooling system was 16 quarts, and the bench-scale sealing tests were performed assuming this cooling system capacity. Today, the average cooling system is significantly smaller, with the average cooling system capacity being approximately 12 quarts. The level of sealing components for this product was determined by first reducing the amount of solids, compared to a previous sealing composition, consistent with the reduction in cooling system size from 16 quarts to 12 quarts. However, the proposed package size of the present composition is 11 fluid ounces, and the package size of the previous sealing composition is 14.5 fluid ounces. For this reason, the actual weight percentage of each sealing component changed little from the previous sealing composition, to maintain substantially the same sealing performance as the previous sealing composition had when it was first developed. Therefore, although the weight percentages of soybean meal, KEVLAR and ATTACLAY are substantially the same in AS-148 as in the previous sealing composition, this represents the addition of approximately 23% less of these ingredients into the cooling system because of the smaller package size.

The levels of soda ash and borax were altered from the previous sealing composition so that a slightly lower pH for the final product would be obtained to be more compatible with metal packaging, for example, aluminum packaging. The amount of soda ash in the formula is sufficient to raise the pH of the water in which the bentonite is to be dispersed to about 9. The level of borax was also increased slightly.

Appropriate levels of corrosion inhibitors were determined by using an electrochemical test method as a screening tool. The level of inhibitors that allowed ASTM "used" coolant to pass this test was included in the formula.

Sealing Efficacy

Description of Experiment

A bench scale device was used to evaluate the performance of sealing products. This device is described in TDN-299. See, Barber, A. G.; TDN-299 Development of a Superior Stop Leak Product (AS-127 Super Sealer), Tarrytown, N.Y.: Union Carbide Corporation, 1982. It can be fitted with adapters which contain crevice leaks from 0.010× 0.5 inches to 0.020×0.5 inches and can operate at elevated temperatures and pressures. This bench scale device is similar to that used in ASTM D3147. See, ASTM Designation: D 3147-94 (Reapproved 1999), "Standard Test Method for Testing Stop-Leak Additives for Engine Coolants". However, a difference between ASTM D3147-94 and our test method is the scale of the experiment. The total capacity of the bench scale unit is 900 mL. The capacity of the device used in ASTM D3147-94 should be between 12 to 13 L.

Samples were prepared in 50% coolant solutions in tap water. The treat rate was determined by the size of product sold, and assuming a 12 quart cooling system. For example, since AS-148 may be sold in a package containing 11 fluid ounces, 29 mL were used in 800 mL coolant. This corresponds to using an entire 11 fluid ounces container of AS-148 in a 12 qt. cooling system. Competitive product treat rates were scaled according to their package sizes.

To quantify the sealing efficacy of AS-148 against its competitors, the volume of coolant lost was recorded after 5 minutes. In these experiments, conditions were maintained at 190° F. and 15 psi, reflecting the conditions in a typical cooling system. Sealing tests were performed using 0.018 in. and 0.016 in. wide crevice leaks.

Results and Statistical Analysis of Sealing Efficacy Tests (0.018" Wide Crevice Leak)

The first sealing tests were performed using a bench-scale stop leak tester at 15 psi and a 0.018 in. crevice leak adapter. The volume of coolant lost was measured after 5 minutes. If all coolant was lost, the test was deemed a "fail". Of the competitors tested, only 2 were able to pass under these conditions in new conventional coolant (YA-335F). They were Bar's Leak Heavy Duty Stop Leak and Radiator Restorer. Experiments were also run in other coolants, including a new extended-life coolant (YA-956B), a new propylene glycol based coolant (YA-947), a "used" conventional coolant (ASTM D6471), and a used extended-life coolant (Texaco). The total of the data collected is summarized below in Table 1.

TABLE 1

Sealing Test Results with 0.018 in. crevice - 5 min @ 15 psi (volume lost mL)

|  | AS-148 | Bar's Leak | Radiator Restorer |
|---|---|---|---|
| YA-335F | 42 | 455 | 190 |
|  | 50 | 270 | 220 |
|  | 55 | 310 | 223 |
|  | 90 | 560 |  |
|  | 94 | 800 |  |
|  | 226 | 570 |  |
| ASTM | 52 | FAIL | 190 |
|  | 120 | FAIL | 230 |
|  | 121 | FAIL | 220 |
| YA-956B | 60 |  | 420 |
|  | 62 |  | 310 |
|  | 74 |  | 500 |
| G-O5 | 37 |  |  |
|  | 89 |  |  |
|  | 71 |  |  |
| Used Texaco | 174 |  |  |
|  | 190 |  |  |
|  | 90 |  |  |
| YA-947 | 32 |  |  |
|  | 50 |  |  |
|  | 43 |  |  |

Discussed below are the statistical analyses of these data.

To apply a statistical t-test, the data was assumed to be approximately normal. Therefore, the first issue that needed to be resolved was whether questionable points, such as the 226 mL loss for AS-148 and the 800 mL loss for Bar's Leak Heavy Duty Stop Leak in YA-335F, should be included in any statistical analysis. To determine whether these points would be included in a normal population, a Q test was performed. See, Dean, R. B.; and W. J. Dixon, *Anal. Chem.*, 1951, 23, 636.

If Q (observed)>Q (tabulated) these questionable data would be discarded. For the 226 mL data point for AS-148 in YA-335F, Q=0.72. Q tabulated for 6 observations is 0.56.[3] Since Q (observed)>Q (tabulated), there was a less than 10% chance that this point would be included in a normal population and it was disregarded. For the 800 mL value associated with Bar's Leak Heavy Duty Stop Leak in YA-335F, Q=0.43. Since Q (observed)=0.43, was less than Q (tabulated)=0.56, there was a greater than 10% chance that this point would be part of a normal population, and it therefore was maintained for statistical analysis.

Also tested using the Q test, were the values of 52 mL when AS-148 was tested in ASTM used coolant, the value of 37 when AS-148 was tested in G-O5, and the value of 90 when AS-148 was tested in used Texaco extended-life coolant. In these cases Q (observed) is 0.96, 0.65, and 0.84, respectively. Since there were only 3 points in each of these populations, Q (tabulated) is 0.94. Therefore, the value of 52 for ASTM used coolant was disregarded. The other points were included in statistical analyses.

To determine if the results of the sealing test of one population were statistically different from another, a t-test (test of means) for a small sample scenario, was done. For these analyses, the means (averages), the number of samples taken (n), and the standard deviations (s) of all the populations were used. These values are reported below in Table 2.

TABLE 2

Values for doing T-tests.

| Population | Mean | n | s |
|---|---|---|---|
| AS-148 in 335F | 66 | 5 | 24 |
| AS-148 in ASTM | 121 | 2 | 1 |
| AS-148 in YA-956B | 65 | 3 | 8 |
| AS-148 in GO5 | 66 | 3 | 26 |
| AS-148 in Texaco | 151 | 3 | 54 |
| Bar's Leak in 335F | 494 | 6 | 195 |
| Radiator Restorer in 335F | 211 | 3 | 18 |
| Radiator Restorer in ASTM | 213 | 3 | 21 |
| Radiator Restorer in YA-956B | 410 | 3 | 95 |
| AS-148 in YA-947 | 42 | 3 | 9 |

First of interest was whether the results obtained for AS-148 in new conventional YA-335 coolant were statistically different than the results obtained in ASTM used coolant, used Texaco, new G-O5, new YA-956B (extended-life), and new YA-947 (propylene glycol). The important values involved in the t-test are summarized below in Table 3. A t-test was not performed on G-O5 since the means of AS-148 in G-O5 and in YA-335F were the same, as seen in Table 2.

TABLE 3

T-test Results for AS-148 in Different Coolants.

| AS-148 in 33SF vs. in | Used ASTM | New YA-956B | Used Texaco | New YA-947 |
|---|---|---|---|---|
| degrees of freedom | 5 | 6 | 6 | 6 |
| t value (95% confidence, $\alpha = 0.05$) | 2.02 | 1.94 | 1.94 | 1.94 |
| pooled variance | 461 | 81 | 1356 | 411 |
| $s_{dm}$ | 24 | 7 | 27 | 15 |
| Dm(calculated) | 48 | 13 | 52 | 29 |
| Dm(actual) | 55 | 1 | 85 | 24 |
| statistical difference | yes | no | yes | no |

The results obtained for AS-148 in YA-335F were statistically the same as the results obtained in G-O5, YA-956B, and YA-948, in other words, all the new coolants. However, the results obtained for AS-148 in ASTM used coolant and used Texaco extended-life coolants were statistically different than those obtained in YA-335F.

Also of interest was whether the results obtained for AS-148 in ASTM used coolant and used Texaco extended-life coolant were statistically different from each other. Summarized below in Table 4 are the results of the test of means.

TABLE 4

T-test Results for AS-148 in 2 Different Used Coolants.
AS-148 in ASTM used coolant vs. used Texaco

| degrees of freedom | 3 |
|---|---|
| t value (95% confidence) | 2.35 |
| pooled variance | 1944 |
| $s_{dm}$ | 40 |
| dm(calculated) | 94 |
| dm(actual) | 30 |
| statistical difference | no |

The results obtained in ASTM used coolant and used Texaco extended-life for AS-148 were not statistically different from each other. Therefore, although the data indicate a decrease in performance of AS-148 in used coolants compared to new coolants, there was not a statistical difference between the results obtained between different types of new coolants and used coolants. Without being bound to any theory, it is believed that this observation was presumably the result of engine oil contamination present in the used coolants, which would change the lubricity and surface tension of the coolant.

It was determined if there was a statistical difference between the performance of AS-148 and that of its competitors. The summary of the test of means between AS-148 and Bar's Leak Heavy Duty Stop Leak in YA-335F is below in Table 5.

TABLE 5

T-test Results between AS-148 and Bar's Leak in Conventional Coolant.
AS-148 vs. Bar's Leak in YA-335F

| | |
|---|---|
| degrees of freedom | 9 |
| t value (95% confidence) | 1.83 |
| pooled variance | 21381 |
| $s_{dm}$ | 86 |
| dm(calculated) | 162 |
| dm(actual) | 428 |
| statistical difference | Yes |

There was a statistical difference between the results obtained for AS-148 and those obtained for Bar's Leak Heavy Duty Stop Leak in YA-335F, with AS-148 resulting in less coolant loss. This indicated that AS-148 was statistically superior to this competitor in new conventional coolant. In ASTM used coolant, Bar's Leak Heavy Duty Stop Leak failed three times. As with AS-148, this indicated a decreased performance in used coolants. However, because this competitor consistently failed in ASTM used coolant and AS-148 did not, it is unnecessary to employ a test of means to determine that the performance of AS-148 was also superior to Bar's Leak Heavy Duty Stop Leak in used coolant.

The test of means was also performed on the data obtained for AS-148 vs. that obtained for Radiator Restorer in both new YA-335F coolant and ASTM used coolant. The results are summarized below in Table 6.

TABLE 6

T-test Results Between AS-148 and Radiator Restorer.

| AS-148 vs. Radiator Restorer | in 335F | in ASTM |
|---|---|---|
| degrees of freedom | 6 | 3 |
| t value (95% confidence) | 1.94 | 2.35 |
| pooled variance | 492 | 294 |
| s(dm) | 16 | 16 |
| dm(calculated) | 31 | 37 |
| dm(actual) | 145 | 92 |
| statistical difference | yes | yes |

Therefore, the performance of AS-148 was statistically superior to that of Radiator Restorer in both new (YA-335F) and used (ASTM) coolant.

In conclusion, although the performance of AS-148 decreased somewhat in used coolants when compared to its performance in new coolants, its superiority over Bar's Leak Heavy Duty Stop Leak and Radiator Restorer was maintained despite the coolant used. In Bar's Leak Heavy Duty Radiator Stop Leak, the same effect was also observed. With Radiator Restorer, this effect was not observed. However, the performance of AS-148 in used coolant was still statistically superior to the performance of Radiator Restorer in used coolant.

Sealing Efficacy vs. Bar's Leak Heavy Duty Radiator Stop Leak with 0.016" Wide Crevice Leak Experiments using the 0.016" wide crevice leak were also performed. This size leak is also considered large. Except for the actual leak size, the same conditions were used as in the experiments with the 0.018" crevice leaks. The coolant used was YA-335F. The results of these experiments were as follows.

| | Volume Lost (mL) | |
|---|---|---|
| | Bar's Leak | AS-148 |
| Test 1 | 460 | 20 |
| Test 2 | 130 | 45 |
| Test 3 | 145 | 44 |
| Test 4 | 90 | 22 |

Excluding the first trial, which is different than the other trials, the average coolant loss for Bar's Leak Heavy Duty Radiator Stop Leak was 122 mL. (Note: Bar's Leak's efficacy seemed to be reduced with longer exposure times to water and coolant. This, perhaps, resulted in further break down of pellets.) The average coolant loss for AS-148 was 33 mL.

Based on these results and the results for the 0.016" crevice leaks, AS-148 could be said to be at least 3 times better than Bar's Leak Heavy Duty Radiator Stop Leak at sealing large leaks.

Corrosion Inhibition/Coolant Compatibility Testing

A. Potentiodynamic Scanning

Description of Experiment

Potentiodynamic scanning is a useful electrochemical test for determining if a coolant solution containing AS-148 would be more or less likely to protect a metal specimen from corrosion than a coolant solution that did not. This test is a potentiodynamic test where voltage is applied and current is measured. More information can be obtained from this test, which could be useful in determining the propensity of a metal specimen to corrode in the presence of a certain solution. The values that can be measured through potentiodynamic scanning include pitting potential, open circuit potential (OCP), passive current and corrosion current. In general, the higher the pitting and open circuit potentials, and the lower the passive and corrosion currents, the less susceptible a specimen is to corrosion. All of these factors can be considered when evaluating a coolant. There are no established pass/fail criteria.

Solutions were prepared to contain 25% antifreeze and 100 ppm NaCl. These are somewhat forcing conditions to promote corrosion. A treat amount of AS-148 was used that was consistent with adding 11 fluid ounces of product to a 12 qt. cooling system.

The reference electrode for these experiments was Ag/AgCl, and the counter electrode was a carbon rod. The working electrode was either aluminum alloy 7072 or brass SAE CA 260, depending on the experiment. In all experiments, an open circuit potential was run for 5 minutes, after which potentiodynamic scanning was initiated starting at −0.02 V vs. OCP and continued at a scan rate of 2 mV/sec. until either active corrosion was observed or a potential of 2 V above OCP was reached.

A summary of the data collected on aluminum and brass is included on the subsequent pages, in Tables 7 and 8. For aluminum, in all cases except for GO5, the coolant with AS-148 indicated benefit over the control. For G-O5, the coolant with AS-148 showed no difference compared to the control. For brass, benefits were seen in YA-335F and ASTM used coolant. There was no significant difference in performance in any other coolants. Used Texaco extended life coolant was not tested on brass due to lack of sufficient availability.

TABLE 7

Potentiodynamic Scanning Data on Aluminum for Coolants with and without Super Stops Leak

| Fluid | OCP (V) | Pitting Potential (V) | Passive Current (Amps) | Corrosion Current (Amps) | Comments |
|---|---|---|---|---|---|
| YA-335F | −0.6542 | 0.7 | $5.2 \times 10^{-6}$ (@ 0.6 V) | $1 \times 10^{-8}$ | "Pitting" observed at 0.9 V could be oxygen evolution. Fluid with Super Stops Leak has a better (lower) current performance over a wide voltage range. |
| YA-335F with Super Stops Leak | −0.5754 | 0.9 | $4.0 \times 10^{-6}$ (@ 0.6 V) | $4 \times 10^{-9}$ | |
| YA-956B | −0.8836 | none observed | $3.6 \times 10^{-6}$ (@ 0.8 V) | $9 \times 10^{-8}$ | Significant improvement in OCP with Super Stops Leak. Fluid with Super Stops Leak has better current performance in the passive region by one order of magnitude. |
| YA-956B with Super Stops Leak | −0.4230 | none observed | $3.8 \times 10^{-6}$ (@0.8 V) | $2 \times 10^{-8}$ | |
| GO5 | −0.4834 | 1.09 | $4.2 \times 10^{-6}$ (@ 0.8 V) | $8 \times 10^{-9}$ | No significant differences. |
| GO5 with Super Stops Leak | −0.5252 | 1.15 | $4.5 \times^{-6}$ (@ 0.8 V) | $6 \times 10^{-9}$ | |
| ASTM Used Coolant | −0.4901 | −0.2 | $1.1 \times 10^{-7}$ (@ −0.25 V) | $8 \times 10^{-9}$ | Significant improvement in pitting potential with Super Stops Leak. No other significant differences |
| ASTM with Super Stops Leak | −0.5504 | −0.04 | $6.8 \times 10^{-8}$ (@ −0.25 V) | $6 \times 10^{-9}$ | |
| Used Peak | −0.4868 | 0.02 and above (inconsistent) | $5.6 \times 10^{-8}$ (@ −0.2 V) | $2 \times 10^{-9}$ | Pitting potential improved with Super Stops Leak. No other significant differences. |
| Used Peak with Super Stops Leak | −0.5472 | 0.04 | $5.2 \times 10^{-8}$ (@ −0.2 V) | $8 \times 10^{-9}$ | |
| Used Texaco | −1.4216 | Active pitting observed immediately | $1 \times 10^{-4}$ (At maximum current) | $9 \times 10^{-6}$ | Corrosion currents improved with Super Stops Leak. Passive current slightly improved with Super Stops Leak. |
| Used Texaco with Super Stops Leak | −1.3746 | Active pitting observed immediately | $7 \times 10^{-5}$ (At maximum current) | $5 \times 10^{-5}$ | |

TABLE 8

Potentiodynamic Scanning Data on Brass for Coolants with and without Super Stops Leak

| Fluid | OCP (V) | Pitting Potential (V) | Passive Current (Amps) | Corrosion Current (Amps) | Comments |
|---|---|---|---|---|---|
| YA-335F | −0.1151 | 0.36 | $1.3 \times 10^{-7}$ (@ 0.25 V) | $3.3 \times 10^{-8}$ | Although pitting potentials are the same, there is an improvement in the passive current, and a significant improvement in the corrosion current with Super Stops Leak. |
| YA-335F with Super Stops Leak | −0.0838 | 0.36 | $6.5 \times 10^{-8}$ (@ 0.25 V) | $3.6 \times 10^{-10}$ | |
| YA-956B | −0.0124 | 1.6 | $4.4 \times 10^{-7}$ (@ 1 V) | $5.2 \times 10^{-9}$ | No significant differences. |
| YA-956B with Super Stops Leak | −0.0257 | 1.5 | $2.3 \times 10^{-7}$ (@ 1 V) | $2.5 \times 10^{-9}$ | |
| GO5 | −0.0332 | 0.52 | $3.0 \times 10^{-8}$ (@ 0.25 V) | $3.6 \times 10^{-9}$ | No significant differences. |
| GO5 with Super Stops Leak | −0.0439 | 0.53 | $4.2 \times 10^{-8}$ (@0.25 V) | $4.1 \times 10^{-9}$ | |
| ASTM Used Coolant | 0.0023 | Same as OCP. Pitting occurred immediately. | No passive region, but @ 0.25 V $3.2 \times 10^{-4}$ | $2.0 \times 10^{-7}$ | Significant improvement in pitting potentials and currents in sample containing Super Stops Leak. |
| ASTM with Super Stops Leak | −0.0438 | 0.36 | $2.4 \times 10^{-7}$ (@ 0.25 V) | $1.5 \times 10^{-9}$ | |
| Used Peak | −0.0517 | 0.32 | $\times 10^{-8}$ (@ 0.15 V) | $9.1 \times 10^{-10}$ | No significant differences. |
| Used Peak with Super Stops Leak | −0.0574 | 0.32 | $2.2 \times 10^{-8}$ | $1.4 \times 10^{-9}$ | |

B. ASTM D 4340 ("Hockey Puck Test")

ASTM D4340 is used to test the effectiveness of a coolant in preventing aluminum corrosion under heat-rejecting conditions. These conditions are typical of aluminum cylinder heads, where the metal is hot and the coolant is not. A heat flux is established through cast aluminum (SAE 326), where the temperature of the aluminum is maintained at 275° F. under a pressure of 28 psi. These conditions are maintained for 1 week, after which the corrosion rate is determined by weight loss in mg/cm$^2$. A strict cleaning regimen for the sample and a control is implemented before weight loss is measured. A weight loss of 1 mg/cm$^2$/wk or greater is considered failing.

The sample solutions prepared for this test contained 25% antifreeze and 100 ppm NaCl. For solutions containing AS-148 the treat rate used was consistent with maintaining the ratio of product to antifreeze when 11 fluid ounces of product was added to a 12 qt. cooling system.

The data from these experiments are summarized in Table 9. Super Radiator Stop Leaks passed this test in every coolant, including used Peak, a coolant that failed without AS-148.

TABLE 9

Summary of ASTM D 4340 (Hockey Puck) Results

Figure 2:
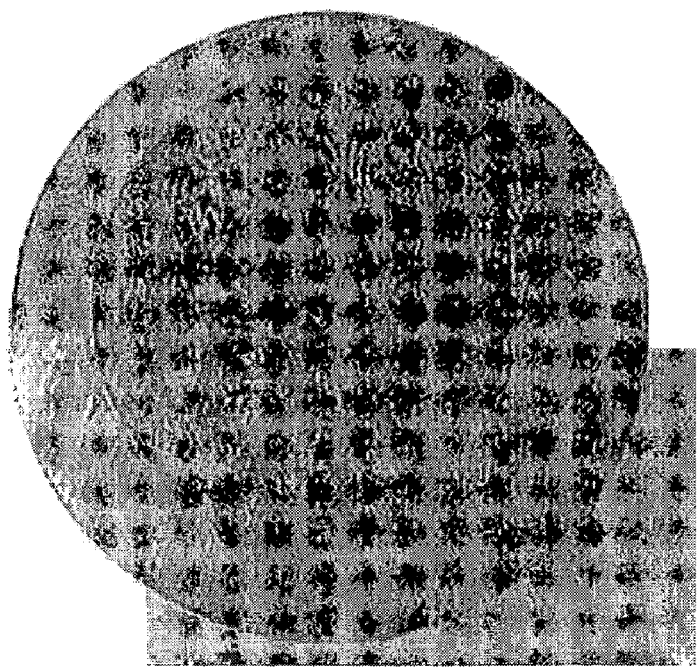
FIG. 2 is a photograph of a metal substrate tested with a used conventional coolant with an embodiment of the composition of the present invention therein, showing substantially no corrosion resulting from a corrosion rate of about −0.7 mg/cm$^2$/wk.

| Fluid | Corrosion Rate (mg/cm$^2$/week) Cast Aluminum | Comments |
|---|---|---|
| YA-335F | Less than 1 | Pass |
| YA-335F with Super Radiator Stop Leaks | 0 | Pass |
| GO5 | Less than 1 | Pass |
| GO5 with Super Radiator Stop Leaks | −0.1081 | Pass |
| Used Peak | 5.2714 | Fail (see FIG. 1) |
| Used Peak with Super Radiator Stop Leaks | −0.6892 | Pass (see FIG. 2) |

Pressurized Overflow Tank Experiments

Description and Results of Experiments

To determine if sealing components could be introduced into the cooling system via the overflow tank in cars without direct access to the radiator, a simulated service unit equipped with a GM-style overflow tank was used. The GM-style tank may be considered somewhat of a challenge, in that the inlet for introduction of product and the outlet into the radiator are rather far apart. Also, this overflow tank is baffled, leaving only 2 approximately 1 cm openings for which product could travel through the overflow tank. The tubing between the overflow tank and the radiator was equipped with glass tubing so that the contents of the flow to the radiator could be observed.

The experiment was performed in three ways. First, with the unit turned off, product was introduced into a nearly full overflow tank. The overflow cap was replaced and the unit was turned on for approximately 10 minutes. The contents passing through the tubing were observed. The clays and Kevlar fiber were reaching the radiator.

The second experiment involved introducing the product into a nearly empty overflow tank and then topping the coolant off. This was to simulate a situation where a leaky cooling system had resulted in coolant loss. Soybean meal was observed traveling through the glass tube to the radiator, as the coolant was introduced. The overflow cap was replaced, and the unit was turned on. Solid material, mostly clays and Kevlar, was observed traveling through the glass tube. Inspection of the overflow tank indicates that approximately 40% of the soybean meal was still in the overflow tank.

The third experiment was similar to the experiment just described, except the unit was turned on before the overflow cap was replaced. As in the second experiment, approximately 60% of the soybean meal passed through the overflow tank, most during the top off of coolant.

These experiments indicate that the lighter sealing components, the clays and Kevlar, traverse the overflow tank to the radiator without problem. The soybean meal, if used in the composition, may require some agitation in the form of top-off or driving.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A composition for sealing at least one fluid leak in heat exchange systems, the composition having a pH within a range of between about 8 and about 9, comprising:
   at least one solvent;
   fibrillated fiber in an amount and of a size sufficient to become entrained in and seal the at least one leak; and
   at least one corrosion inhibitor in an amount sufficient to aid in prevention of corrosion of at least two metals, wherein the at least one corrosion inhibitor is compatible with coolants having organic acid corrosion inhibiting agents therein and with coolants having silicate corrosion inhibiting agents therein, and is therefore selected from the group consisting of alkali metal nitrates, azoles, modified azoles and mixtures thereof.

2. The composition as defined in claim 1, further comprising particulate material in an amount and of a size sufficient to coact with the fibrillated fiber to seal the at least one leak.

3. The composition as defined in claim 1 wherein the composition has a pH of about 9.0.

4. The composition as defined in claim 1 wherein a main component of the coolant having organic acid corrosion inhibiting agents therein and the coolant having silicate corrosion inhibiting agents therein is glycols.

5. The composition as defined in claim 4 wherein the main component of the coolant having organic acid corrosion inhibiting agents therein and the coolant having silicate corrosion inhibiting agents therein is selected from the group consisting of ethylene glycol, diethylene glycol, propylene glycol, glycerol, and mixtures thereof.

6. The composition as defined in claim 1 wherein the at least one corrosion inhibitor is a mixture of sodium nitrate and modified azoles.

7. The composition as defined in claim 1 wherein the fibrillated fiber comprises poly-paraphenylene terephthalamide pulp.

8. The composition as defined in claim 1, further comprising at least one mineral-based material present in an amount sufficient to aid in sealing the at least one leak, wherein the mineral-based material is a clay or clay analog selected from the group consisting of bentonite, smectite, montmorillonite, paligorskite, attapulgite, sepiolite, saponite, kaolinite, halloysite, hectorite, beidellite, stevensite, fire clay, ground shale, mud, silt, and mixtures thereof.

9. The composition as defined in claim 1, further comprising a thickening agent.

10. The composition as defined in claim 1 wherein the solvent is water.

* * * * *